United States Patent Office 3,372,579
Patented Mar. 12, 1968

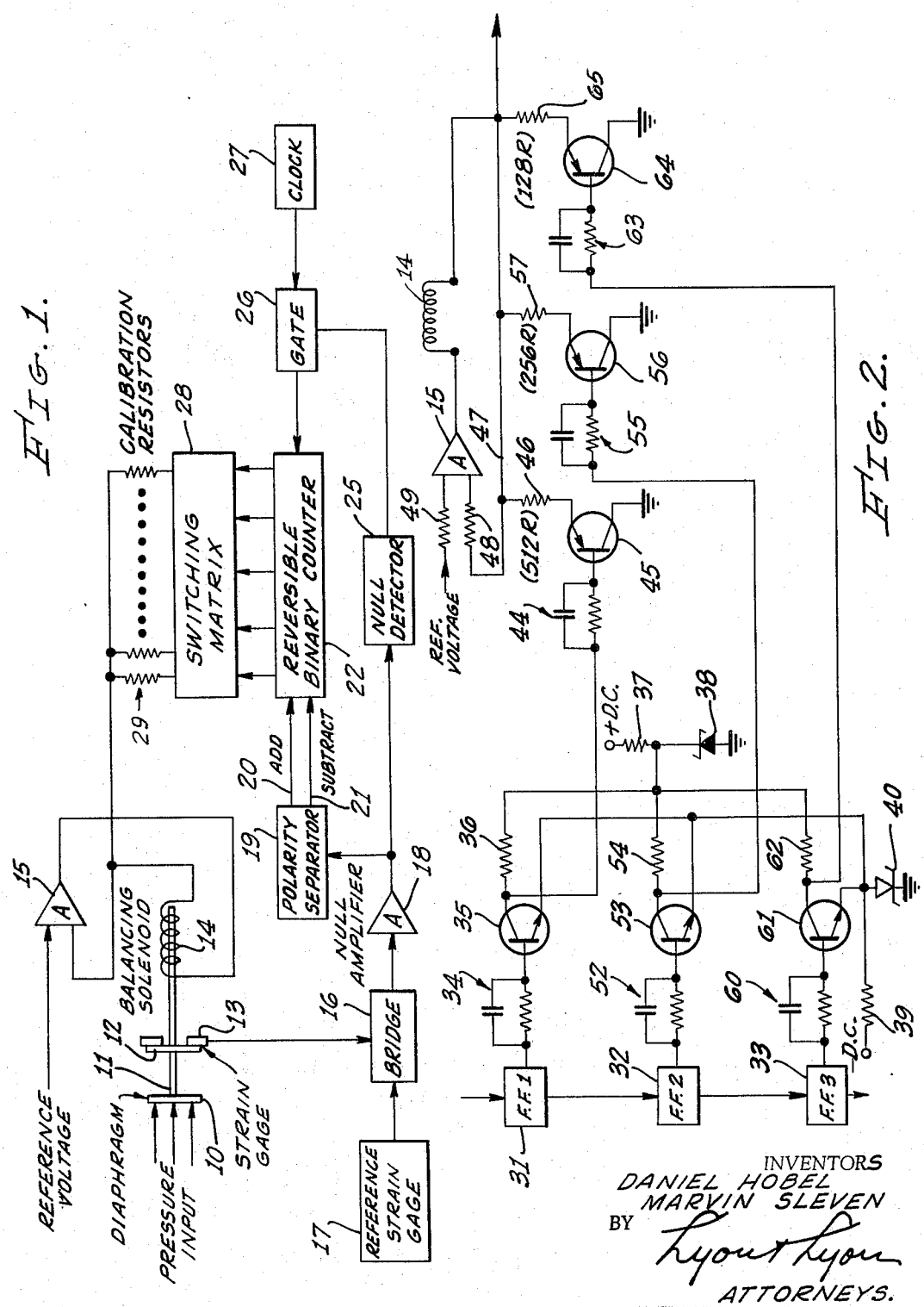

3,372,579
DIGITAL OUTPUT TRANSDUCER
Daniel Hobel and Marvin Sleven, Los Angeles, Calif., assignors to Whittaker Corporation, Los Angeles, Calif., a corporation of California
Filed Dec. 18, 1964, Ser. No. 419,479
11 Claims. (Cl. 73—141)

This invention relates to a transducer and its associated circuitry and more particularly relates to circuitry for use with a transducer which provides a digital indication of transducer output.

Various transducers are presently in use which transform a physical or mechanical phenomenon into an electrical signal. The output circuitry associated with these transducers thus provides an electrical analogue of the phenomenon which, while valuable for many purposes, is not suitable for feeding into the automatic data processing equipment which is often used to evaluate the outputs of one or more such transducers. Because of the inherent limiting factors in transducer performance characteristics, open loop output circuitry does not provide the accuracy and stability required and thus it is desirable to incorporate the transducer in a closed loop servo system.

It is therefore an object of the present invention to provide a transducer system which provides an output in digital form.

It is also an object of the present invention to provide such a system in which closed loop servo system techniques are utilized.

It is another object of the present invention to provide such a system in which a force equal and opposite to that applied to the transducer is developed and the magnitude of this balancing force indicated in digital form.

It is a still further object of the present invention to provide such a system in which a reversible binary counter is used to increase or decrease the magnitude of the balancing force, the output of the binary counter being an indication of the force.

These and other objects and advantages of the present invention will become more apparent upon reference to the accompanying description and drawings in which:

FIGURE 1 is a block diagram of the system of the present invention; and

FIGURE 2 is a schematic diagram of a portion of the binary counter and its associated control circuitry.

Briefly, the system of the present invention compares the output of the transducer to a reference signal and feeds any resulting error signal to a polarity separator, the outputs of which are fed to a reversible binary counter to bias it to add or subtract. The reference signal is normally a zero level signal. The error signal also controls a gate which passes clock pulses to the counter. The various outputs of the counter are connected to binary coded resistors which are connected in the feedback circuit of an amplifier which controls the energization of a solenoid or other device for creating a force opposing the force bearing on the transducer. When the proper resistance is present in the feedback circuit, a force equal and opposite to the measured force will be exerted on the transducer and the magnitude of this force will be indicated in digital form by the output of the counter.

Referring now to FIGURE 1 of the drawing, the system of the present invention is shown in block diagram form, the transducer being illustrated as a strain gage, for example, of the piezo resistive type. The pressure to be measured is exerted on one side of a diaphragm 10 which has a rod 11 mounted on its other side. A plate 12 is mounted on the rod 11 and engages the strain gage 13 to exert the force thereon corresponding to the force exerted on the diaphragm 10. The other end of the rod 11 serves as the armature of a solenoid 14 which is energized by the output of an amplifier 15. The solenoid 14 is wound such that its energization will exert a force on the rod 11 in the direction opposite to that exerted on the rod by the diaphragm 10.

The electrical output of the strain gage 13 is fed to a bridge circuit 16 as is the output of a reference strain gage 17. Said reference strain gage 17 is present to correct for effects of temperature variations. The output of the reference strain gage 17 could be replaced by a zero level signal if temperature compensation was not necessary. The bridge compares the outputs of the strain gages and produces an error signal representative of any difference between them. This error signal is fed to a null amplifier 18, the output of which is fed to a polarity separator 19.

The polarity separator 19 may be any well-known circuit which produces an output signal on a first line 20 if the output of the bridge is positive, i.e., the output of the strain gage 13 is greater than the output of a strain gage 17, and a signal on a second output line 21 if the output of the bridge 16 is negative. The output lines 20 and 21 are connected in the well-known manner to a reversible binary counter 22 and bias the counter to add if a signal appears on the line 20 or to subtract if the signal appears on the line 21.

The output of the null amplifier 18 is also fed through a null detector 25 to a gate 26. The gate 26 responds to the presence of an output from the null amplifier 18 on its control input to permit clock pulses from a clock pulse source 27 to pass to the binary counter 22 to cause it to either add or subtract as determined by the output of the polarity separator 19.

Each of the outputs of the binary counter 22 is connected through a switching matrix 28 to one of a series of binary coded calibration resistors 29. Energization or de-energization of one of the switches in the matrix 28 as a result of a change in output from one of the stages of the counter 22 causes its associated resistor 29 to be connected or disconnected in the feedback circuit of amplifier 15 and causes the output of amplifier 15 to feed increased or decreased current through solenoid 14, maintaining the feedback signal equal to the reference signal at all times. The counter 22 continues to count until the force on the strain gage is such as to produce a zero at the output of null amplifier 18. The output of the counter 22 can then be read out in any conventional manner and will give a digital indication of the force necessary to balance the force exerted on the diaphragm 10.

Turning now to FIGURE 2, the details of the counter, switching matrix and feedback network are illustrated. The binary counter 22 is provided with ten stages, only three of which, the flip-flop 31, the flip-flop 32, and the flip-flop 33 are shown in FIGURE 2. The output of the flip-flop 31 is connected through a peaking circuit 34 to the base of a transistor 35 which acts as a driver amplifier. The collector of the transistor 35 is connected through a resistor 36 to the junction of a resistor 37 and a Zener diode 38, the other end of the resistor 37 being connected to a positive source of DC voltage. The emitter of the transistor 35 is connected to the junction of a resistor 39 and a Zener diode 40, the other end of the resistor 39 being connected to a source of negative DC voltage. The Zener diode references 38 and 40 are provided to bias the driver stage such that maximum voltage swings at its output will be assured.

The collector of the transistor 35 is also connected through a peaking circuit 44 to the base of a switching transistor 45. The collector of the switching transistor 45 is connected to ground and its emitter is connected to one end of a resistor 46, the other end of which is connected to the feedback circuit 47 of the amplifier 15. The feedback circuit 47 includes a feedback resistor 48 which is connected to one input of the amplifier 15. The other input of the amplifier 15 is connected through a resistor 49 to a source of reference voltage.

The output of the flip-flop 32 is connected through a peaking circuit 52 to the base of a transistor 53 which, like the transistor 35, acts as a driver amplifier. The transistor 53 has its collector connected to one side of a resistor 54 the other side of which is connected to the junction of the resistor 37 and the Zener diode 38. The emitter of the transistor 53 is connected to the junction of the resistor 39 and the Zener diode 40.

The collector of the transistor 53 is also connected through a peaking circuit 55 to the base of a switching transistor 56, the collector of which is connected to ground. The emitter of the switching transistor 56 is connected to one side of a resistor 57, the other side of which is connected to the amplifier feedback circuit 47. The resistor 57 is provided with a resistance equal to one-half of the resistance of the resistor 46.

The output of the flip-flop 33 is connected through a peaking circuit 60 to the base of a transistor 61 which like the transistor 35 and 53, acts as a driver amplifier. The collector of the transistor 61 is connected through a resistor 62 to the junction of the resistor 37 and the Zener diode 38. The emitter of the transistor 61 is connected to the junction of the resistor 38 and the diode 40.

The collector of the transistor 61 is also connected through a peaking circuit 63 to the base of the switching transistor 64 which has its emitter connected to the feedback circuit 47 through a resistor 65 and its collector grounded.

The remaining stages of the binary counter are connected through similar driver amplifiers and switching transistors to other resistors connected between the feedback path and ground. The driver stages act to isolate the switches from the flip-flops in the binary counter and provide the low source impedances necessary to drive the switches. The various resistors are related to each other in the same manner as are the stages of the counter and are associated with the stages in the inverse order, that is, they are arranged such that the least significant bit has the highest resistance.

In this instance the resistors are binary coded, thus, the resistor 46 has a value of 512 R., the resistor 57 has a value of 256 R., the resistor 65 has a resistance of 128 R., and so forth. It can be seen that as pulses are fed to the counter 22 by the clock 27 in response to an unbalance of the bridge 16, the various flip-flops will be energized or de-energized depending upon the count, and will cause their associated switching transistors to be turned on or off and thereby connecting the resistors associated with the switches in the on condition between the feedback circuit 47 and signal ground.

The feedback to the amplifier is then proportional to the current in the balancing solenoid, multiplied by the effective resistance of the several resistors in parallel. The amplifier is in balance since this feedback voltage equals the input reference voltage. As this effective resistance varies inversely with the count in the counter, the current in the solenoid will increase to maintain a constant feedback voltage. The system will be in balance when the current through the solenoid produces a force to balance the applied force to the strain gage, thus stopping the counter from counting. To balance, the amplifier will have to produce a higher output current through the solenoid 14.

As the current through the solenoid 14 increases, the magnetic force exerted by the solenoid on the armature or rod 11 correspondingly increases and causes the plate 12 to move against the force exerted on the diaphragm 10. This causes the bridge to become balanced and the output of the null amplifier 18 to go to zero with the result that the gate 26 is closed and no further pulses are supplied to the counter until the pressure on the diaphragm 10 undergoes another change.

If instead of increasing the pressure decreases, the counter will subtract thereby increasing the effective resistance connected in the feedback circuit across the amplifier input and increasing the feedback signal. To regain balance, the amplifier now reduces the current through the solenoid 14 until balance is again attained. At balance, the count within the binary counter represents the pressure data in binary coded form. This is available as a parallel output, and can be transformed by means of simple techniques to any coded format required.

From the foregoing description, it can be seen that a system has been provided that utilizes closed loop servo techniques to provide a binary indication of the force exerted on a transducer. While the embodiment of the invention illustrated utilizes a strain gage type transducer, it should be obvious that the system is equally useful with any transducer or energy converter that produces an electrical output in response to any type of input. It should also be obvious that although the balancing force developing means illustrated is a solenoid, any suitable output device for developing a force, whether electrical, magnetic or mechanical, for balancing the force exerted on the transducer or energy converter may be used.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. In a circuit for varying the output of an amplifier having an output and a plurality of inputs, the combination of a reference voltage coupled to a first of said inputs,
a load for receiving said output signal coupled between said output and a second of said inputs,
feedback signal control means coupled to the junction of said load and said second of said inputs for controlling the signal fed back to the second of said inputs, said feedback signal control means including a plurality of impedance means coupled to said junction, and a plurality of switches respectively coupled to said impedance means, said switches being operable to couple its associated impedance means into or out of circuit with said junction to vary the signal fed back to said second input, and
means coupled to said switches for selectively operating said switches, said means including a multi-stage counter, the stages of said counter being coupled with respective switches whereby the output from a respective stage causes the switch coupled thereto to operate.

2. The circuit of claim 1 wherein
said impedance means are resistances and said resistances are related to each other in the same manner as are the stages of said counter, and are associated with said stages by said switches in the inverse order.

3. A circuit for providing a digital indication of the magnitude of an unknown force comprising means for producing an electrical signal proportional to said force, means for comparing said electrical signal with a reference signal and producing an error signal proportional to the difference therebetween, a reversible counter, means coupling said counter to the output of said comparing means, said coupling means including means for causing said counter to add if said error signal is of a first polarity and subtract if said error signal is of the opposite polarity, means for producing a plurality of pulses means coupled to said pulse producing means and operable in response to said error signal to pass pulses to be counted to said counter, an amplifier having an output and a pair of inputs, means coupled to the output of said amplifier for developing a force in opposition to said unknown force, a reference voltage coupled to a first of said inputs of said amplifier, a feedback circuit including means coupling said force developing means to the second of said inputs, means coupled to said feedback circuit and operable to vary the signal fed back to said second input, and means coupling said operable means to the various stages of said counter whereby the outputs of said stages determine the variation in the fed back signal.

4. A circuit for providing a digital indication of the magnitude of an unknown force comprising means for producing an electrical signal proportional to said force, means for comparing said electrical signal with a reference signal and producing an error signal proportional to the difference therebetween, a reversible counter, means coupling said counter to the output of said comparing means, said coupling means including means for causing said counter to add if said error signal is of a first polarity and subtract if said error signal is of the opposite polarity, means for producing a plurality of pulses means coupled to said pulse producing means and operable in response to said error signal to pass pulses to be counted to said counter, an amplifier having an output and a pair of inputs, means coupled to the output of said amplifier for developing a force in opposition to said unknown force, a reference voltage coupled to a first of said inputs of said amplifier, a feedback circuit including means coupling said force developing means to the second of said inputs, a plurality of impedance means coupled to said feedback means, a plurality of switches, each of said switches being coupled to one of said impedance means and being operable to couple its associated impedance means into or out of said feedback circuit to vary the signal fed back to said second input, and means coupling each of said switches to one of the stages of said counter whereby an output from said stage causes said switch to operate.

5. The circuit of claim 4 wherein said impedance means are resistors and said switches operate to couple said resistors across said second input.

6. The circuit of claim 5 wherein the resistances of said resistors are related to each other in the same manner as are the stages of said counter, and are associated with said stages by said switches in the inverse order.

7. A circuit for providing a digital indication of the magnitude of an unknown force comprising means for producing an electrical signal proportional to said force, means comparing said electrical signal with a reference signal and producing an error signal proportional to the difference therebetween, a reversible counter, a polarity separator coupled to said comparing means and to said counter for causing said counter to add if said error signal is of a first polarity and subtract if said error signal is of the opposite polarity, a source of clock pulses, gate means coupled to said source of pulses, to said counter and to said comparing means, said gate means being operable in response to said error signal to pass pulses from said source to said counter, an amplifier having an output and a pair of inputs, means coupled to the output of said amplifier for developing a force in opposition to said unknown force, a reference voltage coupled to a first of said inputs of said amplifier, a feedback circuit including means coupling said force developing means to the second of said inputs, a plurality of switches, a plurality of resistors having one end coupled to said feedback means and the other end coupled to one of said switches, each of said switches being operable to couple its associated resistor into said feedback circuit across said second input to vary the feedback signal presented to said second input, and means coupling each of said switches to one of the stages of said counter whereby an output from said stage causes said switch to operate.

8. The circuit of claim 7 wherein the resistances of said resistors are related to each other in the same manner as are the stages of said counter, and are associated with said stages by said switches in the inverse order.

9. A circuit for providing a digital indication of the magnitude of a force acting on a transducer which produces an electrical signal in response to said force comprising a reference transducer, means for comparing said electrical signal with the output of said reference transducer and producing an error signal proportional to the difference therebetween, a reversible binary counter having a plurality of stages, a polarity separator coupled to said comparing means and to said counter for causing said counter to add if said error signal is of a first polarity and subtract if said error signal is of the opposite polarity, a source of clock pulses, gate means having an input coupled to said pulse source, an output coupled to said counter and a control input, a null detector coupled to said comparing means and said control input, said null detector being responsive to the presence of an error signal for opening said gate and permitting pulses to pass from said source to said counter, a high gain amplifier having an output and a pair of inputs, means coupled to the output of said amplifier and responsive to the signal therefrom for developing a force opposing said force acting on said transducer, a reference voltage coupled to a first of said inputs of said amplifier, a feedback circuit including means coupling said force developing means to the second of said inputs, a plurality of switches, a plurality of resistors having one end coupled to said feedback means and the other end coupled to one of said switches, each of said switches when closed connecting its associated resistor into said feedback circuit across said second input to vary the feedback signal presented to said second input, and means coupling each of said switches to one of the stages of said counter whereby an output from said stage causes said switch to close, said resistors being binary coded and inversely associated with the stages of said counter by said switches so that the resistor having the largest resistance is associated with the least significant bit in said counter.

10. The circuit of claim 9 wherein said transducer is a pressure sensitive strain gage, said unknown force acts on a diaphragm which is mechanically connected to one side of a plate that exerts pressure on said strain gage, and said force producing means is a solenoid having an armature that is mechanically connected to the other side of said plate, current in said solenoid causing said plate to move away from said strain gage.

11. A circuit for providing a digital indication of the magnitude of an unknown force comprising means for producing an electrical signal representative of the difference between the value of said unknown source and a reference value, a reversible counter, means coupling said counter to the output of said signal producing means, said coupling means including means for causing said counter to add if said electrical signal is greater than said reference value and subtract if said electrical signal is less than said reference value, a source of pulses, means coupled to said pulse source and operable in response to said electrical signal to pass pulses to be counted to said counter, an amplifier having an output and first and second inputs, means for developing a force in opposition to said unknown force, a reference source coupled to said first input of said amplifier, feedback circuit means coupling said force developing means between said output and said second input of said amplifier, and means coupling said feedback circuit means to said counter and operable to vary the signal fed back to said second input by said feedback circuit means.

References Cited

UNITED STATES PATENTS

| | | | |
|---|---|---|---|
| 2,870,408 | 1/1959 | Draganuac | 324—99 XR |
| 3,019,426 | 1/1962 | Gilbert | 340—347.1 |
| 3,042,911 | 7/1962 | Paradise et al. | 340—347 |
| 3,063,018 | 11/1962 | Gordon et al. | 324—99 XR |
| 3,081,637 | 3/1963 | Gevas | 73—517 |
| 3,247,507 | 4/1966 | Moses | 340—347 |

RICHARD C. QUEISSER, *Primary Examiner.*

C. A. RUEHL, *Assistant Examiner.*